Patented Nov. 26, 1929

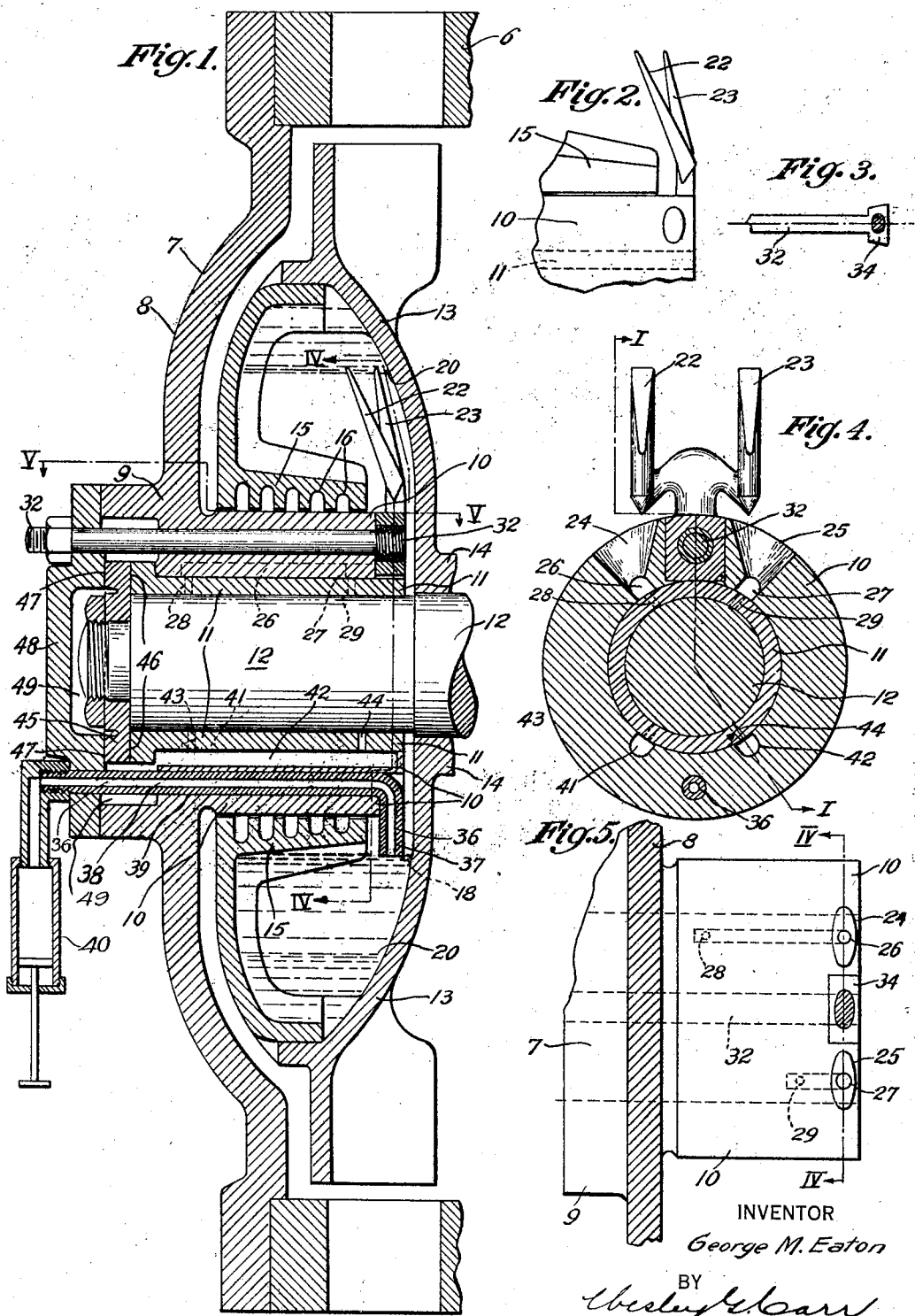

1,737,005

UNITED STATES PATENT OFFICE

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA

ROTARY OILER

Application filed February 21, 1927. Serial No. 169,710.

My invention relates to lubricating devices, and, in particular, it relates to lubricating devices of the type in which oil is contained in a rotating chamber or reservoir mounted on a shaft.

One of the objects of my invention is to provide a practical means for dipping or scooping oil from the toroidal body of lubricant which is thrown to the outer portion of the rotating chamber by centrifugal force, whereby oil may be supplied to the bearing surfaces during the continued rotation of the shaft, as distinguished from such splash lubrication as is obtained in such devices during the starting and stopping periods thereof.

Another object of my invention is to provide a novel filling device which is particularly adapted to rotary oilers of the type just mentioned, whereby the waste of oil may be prevented by initially inserting an excess of oil and subsequently drawing off the excess oil, by suction, until the suction breaks within the oil chamber.

Another object of my invention is to provide a journal bearing having a closed longitudinal oil way in the bottom of the bearing brass for the purpose of retaining oil which is useful to assist in lubricating the bearing during the first fraction of a revolution thereof after a protracted period of standstill.

A still further object of my invention is to provide a single double-acting thrust bearing for taking up the axial thrust, in both directions, in a machine having a horizontal shaft mounted on two supporting bearings, the double-acting thrust bearing being provided with a separate oil reservoir which is in communication with the longitudinal oil way, just mentioned, which is provided in the bottom of the bearing brass of one of the supporting bearings.

With the foregoing and other objects in view, my invention consists in the novel structures and methods of operation hereinafter described and claimed, and illustrated in the accompanying drawing, wherein Figure 1 is a vertical longitudinal sectional view of a bearing embodying my invention, the sectional plane being indicated by the line I—I in Fig. 4, Fig. 2 is a fragmentary elevational detail view of the inner end of the cylindrical sleeve projecting from the hub of the bearing bracket, showing the mounting of the oil-collecting fingers, Fig. 3 is a detail plan view of the rod for supporting the oil-collecting fingers, the latter being broken off for clearness of illustration, Fig. 4 is a fragmentary vertical transverse section on the line IV—IV of Figs. 1 and 5, and Fig. 5 is a fragmentary plan view, partially in section on the line V—V in Fig. 1.

In the drawing, is shown a fragment of a railway-motor frame 6 and a bearing housing 7, the latter comprising a web portion 8 and a hub portion 9 which carries an inwardly projecting cylindrical boss or sleeve 10. The sleeve member just mentioned carries a journal bearing or brass 11 which supports the journal portion of the shaft 12 of the machine.

Lubrication is provided by means of a rotating oil-storing chamber 13 having a hub member 14 which is pressed tightly on the shaft 12. The rotating oil chamber overhangs the inwardly projecting sleeve 10 of the bearing housing and terminates in a cylindrical portion 15 closely surrounding said sleeve and provided with means, indicated at 16, for preventing the loss of oil and entrance of dirt between the free end of said oil chamber and the outer surface of said sleeve.

In operation, oil is inserted into the oiling chamber to the standstill level indicated at 18. When the shaft rotates, the oil is thrown out into a toroidal formation in the outer portions of the oil chamber, as indicated by the rotating oil level 20.

In order to provide a copious supply of oil for the bearing during the continued rotation of the shaft, upwardly projecting oil-collecting fingers 22 and 23 are provided for dipping into the rotating body of oil and causing a stream of oil to flow down each finger, whence it is collected in suitable drip-catching pockets 24 and 25 provided in the sleeve, the oil being thence directed to different portions of the bearing by means of ducts 26 and 27 and perforations 28 and 29 in the bearing brass, as indicated in Figs. 4 and 5.

It will be noted that the fingers 22 and 23 are displaced in an axial direction, so that they dip into the rotating body of oil in different planes in order that one of the fingers shall not dip into the groove of oil produced by the other finger.

In order to provide means for assembling the oil-catching fingers 22 and 23 so as to project up within the oil-storing chamber, I have provided a novel means for mounting the fingers, by supporting the same from the end of a rod or bolt 32 which constitutes an integral part of the finger structure, and which extends through a hole parallel with the axis and located in the middle of the wall thickness of the sleeve 10 of the bearing housing, and vertically over the axis.

In the assembly of the housing, the oil-collecting fingers 22, 23 and their bolt 32 are inserted into the rotating oil chamber 13 before the shaft is inserted into the bearing housing 7. It will be noted that, in the design shown in the drawing, this assembly has to be made before the rotary oil chamber 13 is pressed onto the shaft of the machine, but it is obviously possible to utilize a finger construction which may be assembled through the annular space between the shaft journal and the bore of the oil-baffle member 15 of the rotating oil chamber 13.

When the shaft is inserted into the bearing bracket, the end of the bolt 32 is directed into the bolt hole in the housing, and when the housing is nearly home the projecting end of the bolt is drawn up, causing the other end of the bolt, which carries the fingers, to be seated in a taper seat therefor, as indicated by the tapered end construction of the bolt head 34 shown in Fig. 3, thereby insuring that the fingers shall stand up in the proper position.

In order to fill the rotating oil-storing chamber 13 with oil and to determine that the oil is at the proper level, I have provided a bent filling pipe 36 comprising a depending end 37 extending down to the standing oil level 18, and a straight portion 38 extending through a longitudinal hole 39 in the bottom of the housing sleeve 10. It is obvious that the filling pipe may be mounted for rotary movement to permit the assembly of the parts, in the manner above described for the oil-collecting fingers 22 and 23.

The filling is accomplished by means of an oil gun 40, and filling is continued until it is found that, on drawing back the piston of the gun, or, in general, on reversing the pumping action of the gun, a certain amount of oil is drawn out of the chamber 13. The suction of the oil from the oil chamber is continued until the oil level within the oil chamber falls down to the bottom end of the depending filling pipe 37, when the suction breaks, and no more oil may be withdrawn from the chamber. It is thus insured that oil shall be at a proper level 18 in the oil-storing chamber 13.

One of the most difficult phases of the operation of bearings of the non-pressure-feed type is the tendency of the bearings to become dry after a long period of standstill. As a result of such dryness, many otherwise good bearings have been ruined during the first revolution, or fraction of a revolution, of the shaft after a long period of standstill. In order to overcome the difficulty just mentioned, I have provided two closed longitudinally-extending oil ways 41 and 42 in the bottom of the housing sleeve 10 under the bearing brass 11 for retaining the oil which accumulates therein during the rotation of the shaft, the bearing surface being in communication with said oil ways by means of openings 43 and 44 in the brass 11 as shown in Figs. 1 and 4.

It will be noted that the oil ways just mentioned do not extend quite through to the inner end of the inwardly projecting housing sleeve, that end being closed so that oil does not escape therefrom into the rotating oil-storing chamber. The other ends of the oil ways communicate with a thrust bearing 45 which constitutes a desirable feature of my invention.

In most railway motors, for example, it has been customary to provide a thrust bearing at each end of the machine, thereby necessitating the utilization of shims and the provision of free access to both ends of the motor, in order to compensate for wear on the thrust surfaces. It is extremely desirable to provide a double-acting thrust bearing at only one end of the machine, whereby the axial thrust in both directions may be taken up by a single bearing, but difficulties have been encountered in the provision of proper lubricating means for lubricating both the double-acting thrust bearing and the adjacent journal bearing.

According to my invention, only one end of the shaft is provided with a thrust bearing plate or collar 45 which is disposed between the two stationary thrust bearing surfaces 46 and 47, one surface 46 being provided by the end of the bearing brass 11, and the other thrust bearing surface being provided by a cap member 48 closing the hub 9 of the bearing housing.

A special oil reservoir 49 for the thrust member is provided between the cap member 48 and the hub member 9 and is kept well supplied with oil by reason of the fact that the longitudinally extending oil ways 41 and 42 in the bottom of the bearing sleeve open onto the thrust-bearing reservoir 49, so as to maintain the oil therein at the same level as in the oil ways, or even at higher levels during the rotation of the shaft.

It will be understood, of course, that when the shaft is standing still, the oil leakage along the bottom of the shaft will soon cause the oil level in the thrust bearing reservoir 49 to be no higher than the bottom of the shaft, but during the rotation of the shaft the flow of oil in the journal bearing is sufficiently copious to cause the oil level in the thrust bearing reservoir to rise to a somewhat higher level, thereby cooperating with the longitudinal ways 41 and 42 to insure that the same are always filled with oil.

The journal bearing is thus able to withstand a long period of standby without ever becoming dry in the bottom portion thereof. When the shaft is turned after a period of standby, it will be obvious that the first half-revolution will bring the oily side of the shaft up to the top, so that lubrication is provided at the very start of the operation, thereby avoiding one of the great draw-backs inherent in oiling systems utilizing a rotating oil-storing chamber.

It will be noted that the shaft is shown in the drawing as terminating within the end cap 48. It will be obvious that, where the shaft extends through the bearing housing, the usual means for preventing the escape of oil and the entrance of dirt will be provided, in lieu of the end cap which performs such function in the bearing illustrated in the drawing.

The foregoing and other modifications and changes in my construction will be obvious, without further description, to those skilled in the art, and it is my desire that the appended claims shall be construed as embracing all such modifications and changes as are fairly embraced within the language thereof when read in the light of the prior art.

I claim as my invention:

1. A self-contained oil reservoir and bearing comprising a stationary bearing housing having a supporting web and a laterally extending bearing sleeve supported by said web, a journal bearing carried by said sleeve, a rotating shaft journaled in said journal bearing, a rotating hub fixed to said shaft near the free end of said sleeve, a rotating oil-storing chamber carried by said hub and overhanging a substantial portion of said sleeve, means for preventing loss of oil and entrance of dirt between the free end of said chamber and the outer surface of said sleeve, means for preventing loss of oil and entrance of dirt at the end of said journal bearing opposite to said hub, said housing sleeve and journal bearing being provided with a hole in the upper portion thereof for supplying oil to the journal from said chamber, and a combined oil filling and gauging device embodied as a part of said stationary housing.

2. A self-contained oil reservoir and bearing comprising a stationary bearing housing having a supporting web and a laterally extending bearing sleeve supported by said web, a journal bearing carried by said sleeve, a rotating shaft journaled in said journal bearing, a rotating hub fixed to said shaft near the free end of said sleeve, a rotating oil-storing chamber carried by said hub, and a combined oil filling and gauging device embodied as a part of said stationary housing and comprising an oil filling pipe extending through said housing sleeve and depending from the free end thereof into said oil chamber to the level desired for the oil.

3. A bearing comprising an inaccessible oil-storing chamber, an oil filling and gauging device located above the standing oil level and extending down to, and terminating at, said level, and a reversible-oil pump adapted to be tightly secured to said filling and gauging device, whereby the oil level may be predetermined, during the filling operation, by supplying an excess of oil and sucking it out through the filling opening until the suction breaks.

4. In a bearing structure, a housing having a cylindrical bearing boss pierced by a longitudinally extending hole in the bottom portion thereof, a rotating shaft journaled in said bearing boss, an oil-storing chamber carried by said shaft and rotating therewith, an oil-filling pipe having a portion extending downwardly from the inner end of said hole to the desired standing oil level in said chamber, means operable from the outer end of said hole for rotating said depending portion to a position where it is removable from said chamber, and a reversible oil pump adapted to be tighty secured to said oil-filling pipe through the outer end of said hole.

5. A bearing comprising a shaft having a cylindrical journal, a housing sleeve having a journal bearing for said shaft, a thrust bearing at one end of said journal bearing, means for supplying oil through said sleeve and applying the same to said journal at a point above the bottom thereof, and a closed longitudinal oil way at the bottom of said journal bearing for retaining oil draining from said journal, said longitudinal oil way being in communication with said thrust bearing.

6. A bearing comprising a shaft having a cylindrical journal, a housing sleeve having a journal bearing for said shaft, a double-acting thrust bearing at one of of said journal bearing for taking up the axial trust in both directions, a separate oil reservoir for said thrust bearing, means for supplying oil through said sleeve and applying the same to said journal at a point above the bottom thereof, and a closed longitudinal oil way at the bottom of said journal bearing for retaining oil from said journal, said longitudinal oil way being in communication with said thrust bearing reservoir.

7. A machine having a horizontal shaft mounted on two supporting bearings, one of said supporting bearings comprising a cylindrical bearing boss for said shaft, a double-acting thrust bearing at one end of said bearing boss for taking up the axial thrust of the shaft in both directions, a separate oil reservoir for said thrust bearing, means for supplying oil to said bearing boss at a point above the bottom thereof, and a closed longitudinal oil way in the bottom of said bearing boss for retaining oil from said journal, said longitudinal oil way being in communication with said thrust bearing reservoir.

In testimony whereof, I have hereunto subscribed my name this 9th day of February, 1927.

GEORGE M. EATON.